(12) United States Patent
Conti

(10) Patent No.: US 7,030,617 B2
(45) Date of Patent: Apr. 18, 2006

(54) SYSTEM, APPARATUS, AND METHOD FOR CONDUCTING ELECTROMAGNETIC INDUCTION SURVEYS

(75) Inventor: Ugo Conti, El Cerrito, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 6 days.

(21) Appl. No.: 11/020,448

(22) Filed: Dec. 23, 2004

(65) Prior Publication Data

US 2005/0156602 A1 Jul. 21, 2005

Related U.S. Application Data

(60) Continuation-in-part of application No. 10/753,621, filed on Jan. 8, 2004, which is a division of application No. 09/879,252, filed on Jun. 12, 2001, now Pat. No. 6,703,838, which is a continuation-in-part of application No. 09/610,573, filed on Jul. 5, 2000, now abandoned, which is a division of application No. 09/290,156, filed on Apr. 12, 1999, now abandoned.

(60) Provisional application No. 60/081,653, filed on Apr. 13, 1998.

(51) Int. Cl.
*G01V 3/18* (2006.01)
(52) U.S. Cl. ........................ 324/339; 324/344
(58) Field of Classification Search ................ 324/339, 324/344
See application file for complete search history.

(56) References Cited

U.S. PATENT DOCUMENTS

| 4,748,415 A | 5/1988 | Vail, III | 324/339 |
| 4,901,023 A | 2/1990 | Vail, III | 324/339 |

(Continued)

OTHER PUBLICATIONS

Wilt, M. et al, "Crosshole electromagnetic tomography: A new technology for oil field characterization," *The Leading Edge*, 1995, pp. 173-177.

(Continued)

*Primary Examiner*—Michael Tokar
*Assistant Examiner*—Tyrone Jackson
(74) *Attorney, Agent, or Firm*—Kevin P. McEnaney; Victor H. Segura; Brigitte L. Echols

(57) ABSTRACT

A method is provided for conducting an electromagnetic induction survey of a geological formation penetrated by a borehole lined with a conductive casing. The method includes positioning a transmitter in the borehole, whereby the transmitter generates a transmitter magnetic moment, and positioning a distant receiver external of the borehole to detect a magnetic field induced by the transmitter, whereby the distant receiver is disposed across part of the formation from the borehole. Furthermore, an auxiliary receiver is positioned in the borehole proximate the transmitter to detect a magnetic field induced by the transmitter and attenuated by the conductive casing. Subsequently, a first casing attenuation factor that is applicable to the magnetic field measured by the auxiliary receiver is determined from a ratio of the measured magnetic field at the auxiliary receiver and the transmitter magnetic moment. A second casing attenuation factor applicable to the measurement of the magnetic field at the distant receiver is determined from a non-linear relationship (e.g., a power law relationship) between the first casing attenuation factor and the second attenuation factor, wherein the second attenuation factor is less than the first attenuation factor. Then, a formation attenuation factor applicable to the measured magnetic field at the distant receiver is determined from a relationship between the magnetic moment of the transmitter, the second casing attenuation factor, and the measured magnetic field at the distant receiver. Finally, the method correlates the determined value of the formation attenuation factor to a resistivity characteristic of the formation between the distant receiver and the transmitter.

15 Claims, 7 Drawing Sheets

U.S. PATENT DOCUMENTS

| | | | |
|---|---|---|---|
| 4,903,207 A | 2/1990 | Alger et al. | 364/422 |
| 5,018,590 A | 5/1991 | Weldon | 175/105 |
| 5,038,107 A | 8/1991 | Gianzero et al. | 324/339 |
| 5,065,100 A | 11/1991 | Vail, III | 324/339 |
| 5,130,655 A | 7/1992 | Conti | 324/258 |
| 5,157,392 A | 10/1992 | Zimmer | 340/853.9 |
| 5,260,661 A | 11/1993 | Vail, III | 324/339 |
| 5,283,520 A | 2/1994 | Martin et al. | 324/220 |
| 5,426,367 A | 6/1995 | Martin et al. | 324/339 |
| 5,586,082 A | 12/1996 | Anderson et al. | 367/73 |
| 5,621,169 A | 4/1997 | Harris et al. | 73/152.18 |
| 5,646,533 A | 7/1997 | Locatelli et al. | 324/339 |
| 5,654,639 A | 8/1997 | Locatelli et al. | 324/339 |
| 6,075,462 A * | 6/2000 | Smith | 340/854.6 |
| 6,294,917 B1 * | 9/2001 | Nichols | 324/339 |
| 6,534,986 B1 * | 3/2003 | Nichols | 324/339 |
| 6,628,118 B1 * | 9/2003 | Amini | 324/334 |

OTHER PUBLICATIONS

Wilt, M.J. et al. "Crosswell electromagnetic tomography: System design consideration and field results," *Geophysics*, vol. 60, Bi, 3m 1995.

Wilt, Michael et al., "Electromagnetic methods for development and production: State of the art," *The Leading Edge*, pp. 487-490 (Apr. 1998).

Wu, Xu et al, "Influence of steel casings on electromagnetic signals," *Geophysics*, vol. 59, No. 3, 1994.

Augustin, A.M. et al, "A theoretical study of surface-to-borehole electromagnetic logging in cased holes," *Geophysics*, vol. 54, No. 1, 1989.

* cited by examiner

SYSTEM, APPARATUS, AND METHOD FOR CONDUCTING ELECTROMAGNETIC INDUCTION SURVEYS

This is a Continuation-in-Part of U.S. application Ser. No. 10/753,621, filed Jan. 8, 2004, which is a Divisional Application of U.S. application Ser. No. 09/879,252, filed Jun. 12, 2001 (which issued as U.S. Pat. No. 6,703,838), which is Continuation-in-Part of U.S. application Ser. No. 09/610,573 filed on Jul. 5, 2000 now abandoned, which is a Divisional Application of U.S. application Ser. No. 09/290,156 filed on Apr. 12, 1999 now abandoned, which claimed priority of a provisional U.S. Application Ser. No. 60/081,653, filed on Apr. 13, 1998 and entitled "ELECTROMAGNETIC INDUCTION METHOD AND APPARATUS FOR THE MEASUREMENT OF THE ELECTRICAL RESISTIVITY OF ROCK FORMATIONS BETWEEN DRILL HOLES CASED WITH STEEL."

FIELD OF THE INVENTION

The present invention relates generally to well logging techniques using electromagnetic measurements. More particularly, the invention relates to electromagnetic induction surveys between boreholes, at least one of which includes a conductive liner. The survey method of the present invention preferably provides a measurement, estimation, or determination of subsurface formation properties such as electrical resistivity using electromagnetic induction surveys and involving a borehole lined with a conductive tubular or casing. A system for implementing such surveying methods may be referred to herein as an electromagnetic induction survey system or a electromagnetic tomography system.

BACKGROUND OF THE INVENTION

Geological formations forming a reservoir for the accumulation of hydrocarbons in the subsurface of the earth contain a network of interconnected paths in which fluids are disposed that may ingress or egress from the reservoir. To determine the behavior of the fluids in this network, knowledge of both the porosity and permeability of the geological formations is desired. From this information, efficient development and management of hydrocarbon reservoirs may be achieved. For example, the resistivity of geological formations is a function of both porosity and permeability. Considering that hydrocarbons are electrically insulative and most water contain salts, which are highly conductive, resistivity measurements are a valuable tool in determining the presence of hydrocarbon reservoir in the formations.

To that end, there have been many prior art attempts to model geological formations. In two articles, "Crosshole Electromagnetic Tomography: A New Technology for Oil Field Characterization," The Leading Edge, March 1995, by Wilt et al. and "Crosshole Electromagnetic Tomography: System Design Considerations and Field Results," Society of Exploration Geophysics, Vol. 60, No. 3 1995, by Wilt et al., measurement of geological formation resistivity is described employing a low frequency electromagnetic system.

FIG. 1 shows typical equipment used in the measurement of geological formation 10 resistivity between two drill holes 12a and 12b using electromagnetic induction. A transmitter T is located in one borehole, while a receiver R is placed in another borehole. The transmitter T typically consists of a coil (not shown) having a multi-turn loop (which consists of $N_T$ turns of wire) wrapped around a magnetically permeable core (mu-metal or ferrite) with a cross section, $A_T$. The transmitter T may further comprise a capacitor (not shown) for tuning the frequency of the coil. When an alternating current, $I_T$, at a frequency of $f_0$ Hz passes through this multi-turn loop, a time varying magnetic moment, $M_T$, is produced in the transmitter T. This magnetic moment is defined as follows:

$$M_T = N_T I_T A_T \quad (1)$$

The magnetic moment $M_T$ can be detected by the receiver R as a magnetic field, $B_R$. The transmitter T, receiver R, or both are typically disposed in boreholes (e.g., 12a and 12b) in the earth formation 10. In this case, the detected magnetic field, $B_R$, is proportional to the magnetic moment of the transmitter, $M_T$, and to a geological factor, $k_f$, and a geometric factor b. In a rectangular coordinate system with the dipole moment $M_T$ in the x direction the field of a dc dipole ( or a low frequency dipole in free space is given by;

$$\bar{B} = \frac{\mu_0 M_T}{4\pi r^3}\left[\frac{x^2}{r^2}\bar{u}_x + \frac{xy}{r^2}\bar{u}_y + \frac{yz}{r^2}\bar{u}_z\right] \quad (2a)$$

where the $\bar{u}$ are unit vectors in the x, y, and z directions. As the frequency increases when the dipole is in a conductive formation the above magnetic response is modified by the induced currents in the formation by a factor which is called here the formation factor $k_f$. In a short form, the response may be written as $$B_R = bk_f M_T \quad (2b)$$

The geological factor, $k_f$, is a function of the electrical conductivity distribution of the geological formation between the transmitter and the receiver. The factor b is a function of the spatial location and orientation of the field component of the magnetic field, $B_R$, with respect to the magnetic moment of the transmitter, $M_T$.

The receiver R typically includes one or more antennas (not shown). Each antenna includes a multi-turn loop of wire wound around a core of magnetically permeable metal or ferrite. The changing magnetic field sensed by the receiver R creates an induced voltage in the receiver coil (not shown). This induced voltage ($V_R$) is a function of the detected magnetic field ($B_R$), the frequency ($f_0$), the number of turns ($N_R$) of wire in the receiver coil, the effective cross-sectional area of the coil ($A_R$), and the effective permeability ($\rho_R$) of the coil. Thus, $V_R$ can be defined as follows:

$$V_R = \pi f_0 B_R N_R A_R \rho_R \quad (3)$$

While $f_0$ and $N_R$ are known, the product, $A_R \rho_R$, is difficult to calculate. In practice, these constants may be grouped together as $k_R$ and equation (3) may be simplified as:

$$V_R = k_R B_R \quad (4)$$

where $k_R = \pi f_0 N_R A_R \rho_R$.

Thus, instead of determining the product $A_R \rho_R$, it is more convenient to determine $k_R$ according to the following procedures. First, the receiver coil is calibrated in a known field, at a known frequency. Then, the exact value for $k_R$ is derived from the magnetic field ($B_R$) and the measured voltage ($V_R$) according to the following equation:

$$k_R = B_R/V_R \quad (5)$$

When this system is placed in a conducting geological formation, the time-varying magnetic field, $B_R$, which is produced by the transmitter magnetic moment $M_T$, produces a voltage in the geological formation, which in turn drives a current therein, $L_1$. The current, $L_1$, is proportional to the conductivity of the geological formation and is generally concentric about the longitudinal axis of the borehole. The magnetic field proximate to the borehole results from a free space field, called the primary magnetic field, while the field resulting from current $L_1$ is called the secondary magnetic field.

The current, $L_1$, is typically out of phase with respect to the transmitter current, $I_T$. At very low frequencies, where the inductive reactance is small, the current, $L_1$, is proportional to dB/dt and is 90° out of phase with respect to $I_T$. As the frequency increases, the inductive reactance increases and the phase of the induced current, $L_1$, increases to greater than 90°. The secondary magnetic field induced by current $L_1$ also has a phase shift relative to the induced current $L_1$ and so the total magnetic field as detected by receiver R is complex.

The complex magnetic field detected by receiver R may be separated into two components: a real component, $B_R$, which is in-phase with the transmitter current, $I_T$, and an imaginary (or quadrature) component, $B_I$, which is phase-shifted by 90°. The values of the real component, $B_R$, and the quadrature component, $B_I$, of the magnetic field at a given frequency and geometrical configuration uniquely specify the electrical resistivity of a homogeneous formation pierced by the drill holes. In an inhomogeneous geological formation, however, the complex field is measured at a succession of points along the longitudinal axis of the receiver borehole for each of a succession of transmitter locations. The multiplicity of measurements thus obtained can then be used to determine the inhomogeneous resistivity distribution between the holes.

In both cases, i.e., measuring homogeneous geological formation resistivity or measuring inhomogeneous geological formation resistivity, the measurements are typically made before extraction of hydrocarbons takes place. This is because the boreholes typically are cased with conductive liners (e.g., metallic casing; see 16a and 16b in FIG. 1) in order to preserve the physical integrity of the borehole during hydrocarbon extraction. The conductive tubular liners interfere with resistivity measurements and are difficult and costly to remove from the borehole once they are installed. As a result, prior art systems such as that shown in FIG. 1 are not suitable for analyzing hydrocarbon reservoirs once extraction of the hydrocarbons begins.

The problems presented by conductive liners (16a and 16b in FIG. 1) are described by Augustin et al., in "A Theoretical Study of Surface-to-Borehole Electromagnetic Logging in Cased Holes," Geophysics, Vol. 54, No. 1 (1989); Uchida et al., in "Effect of a Steel Casing on Crosshole EM Measurements," SEG Annual Meeting, Texas (1991); and Wu et al., in "Influence of Steel Casing on Electromagnetic Signals," Geophysics, Vol. 59, No. 3 (1994). These prior art references show that coupling between a transmitter and a conductive liner is independent of the surrounding geological formation conductivity for a wide range of practical formation resistivities encountered in the field. The references show further that the magnetic field produced inside the conductive liner at a distance of a few meters or less from the transmitter depends only on the conductive liner properties and not on the formation properties.

The net or effective moment, $M_{eff}$, of a transmitter inside a conductive liner is dictated by the inductive coupling between the transmitter and the conductive liner. Physically, the resistivity of the conductive liner is very low and the inductance relatively high. This property results in a current of almost the same magnitude as that of the transmitter current being induced in the conductive liner. Lenz's Law predicts that the magnetic field generated by this induced current in the conductive liner will oppose the time-varying magnetic field produced by the transmitter current. Thus, the magnetic field generated by the transmitter is mostly cancelled out by the magnetic field generated by the conductive liner. As a result, the magnetic field external to the conductive liner is greatly reduced, and its magnitude is proportional to the difference in currents in the transmitter and the conductive liner. In effect, the conductive liner "shields" the transmitter from any receiver positioned outside of the conductive liner. This is sometimes referred to herein as the "casing effect" on the measurement of the external magnetic field. The effective moment, the moment seen by a receiver outside the casing, is conveniently expressed by:

$$M_{eff} = k_c M_T \tag{6}$$

where $k_c$ is the casing attenuation factor.

An analogous situation is present with respect to a receiver if it is surrounded by a conductive liner, and the situation is exacerbated if both the transmitter and the receiver are surrounded by conductive liners.

To overcome the shielding problem (the "casing effect" or "casing attenuation effects"), various techniques have been suggested. For example, U.S. Pat. No. 5,646,533, entitled "Induction Measurement in the Presence of Metallic, Magnetic Walls" and issued to Locatelli, et al., discloses a method of magnetically saturating the metallic wall to overcome this problem. Alternatively, gapped casing has been used to achieve a similar effect. Another approach is to determine the conductive liner properties (e.g., radius, thickness, conductivity, and permeability) and then compensate for these properties. However, the correction needed to compensate for the conductive liner properties may be several orders of magnitude larger than the magnetic field sensed by the receiver outside the casing. Any inaccurate correction for the conductive liner properties would have an enormous impact on the accuracy of the "corrected field." Furthermore, conductive liners often are not homogeneous (e.g., due to variation in thickness, corrosion, or rust formation); such variations may further compromise the accuracy of the "corrected field."

Before providing more detailed description of this preferred or improved method, it may be helpful to elaborate further on crosshole electromagnetic surveys in general.

In addition to frequency, other important survey parameters include the length of the data profiles and the spacing between receiver points. These parameters determine the duration of the field survey as well as the resolution of the images. Ideally, individual data profiles should be twice as long as the borehole separation and the spacing between receiver data points should be about five percent (5%) of the well separation. For example, where the boreholes are spaced 200 meters apart, the profiles should be 400 meters long (along the axial length of the borehole) with a receiver 24, FIG. 2, spaced every 10 meters in each of the boreholes. Note that data are collected continuously as the transmitter moves in one of the boreholes, so the physical spacing between transmitter readings is much closer than spacing between the transmitter 20 and receiver 24.

Sometimes the imaging target lies within a restricted depth interval. For example, a particular oil sand undergoing water flooding. In this case the tomography can be substantially focused on this interval and the profile length reduced. It is recommended that a profile length equal to the distance between wells and a receiver spacing of five percent (5%) of the borehole spacing in the region of interest, but ten (10%) above or below these depths. The resulting image will provide good detail in the region of interest but less above or below.

Additionally, there are often physical restrictions on a survey. For example, imaging boreholes are frequently completed to the depth of the primary hydrocarbon bearing zone. It is useful, however, to extend the measurements to below this interval, but this is not possible if existing wells are utilized. The output of images taken under these less than ideal conditions is not always predictable. Usually the resolution is somewhat reduced as compared to full coverage data, but often the data are sufficient for resolving large-scale structures. In addition, these data are often still quite valuable for process monitoring applications, such as in water or steam floods.

During operation, receiver 24 is positioned at various fixed depths within the borehole 12b, while transmitter 20 is pulled up continuously at a constant rate, vice versa. Therefore, for every position of receiver 24, there are measurements made at a plurality of positions of transmitter 20, defining a run of data. A plurality of runs of data is taken, with receiver 24 positions at different depths for each run. In this manner, one complete set of tomography data within the depth range of interest is achieved. Usually, the intervals between different positions of receiver 24 are about 5% of the distance between the boreholes. Receiver 24 may be first moved by twice this interval at a plurality of positions. After the desired region has been measured, receiver 24 is moved back to acquire the data at points equal-distance from adjacent positions of the aforementioned plurality of positions.

During data acquisition, procedures should be undertaken to ensure high quality measurements. To that end, initial tests may include the magnetic fields generated and sensed by system 19 with both transmitter 20 and receiver 24 suspended in the air above the boreholes. This facilitates determining the primary magnetic field without the effect of the earth.

In addition, a linearity test may be conducted after transmitter 20 and receiver 24 have been lowered in their respective borehole. A measurement at the standard operating voltage is made, followed by a second measurement at a lower voltage. The ratio of the resultant magnetic fields to the transmitter flux should be within about ten percent for each voltage level. After passing the linearity and primary field tests, normal logging operations may commence. It is preferred that the initial two logging runs be reserved for a repeatability test. These back-to-back logs should agree to within about one percent in amplitude and about one degree in phase for logging to proceed. "Warm" transmitter 20 and receiver 24 response should be within the one percent tolerance. Tests may also be performed during logging.

Tests may also be conducted on the measurements after the data collection is complete. One such test is referred to as a profile tie in which transmitter 20 is maintained at a fixed position near the top of the profile and sequentially moves receiver 24 to all of the depths it previously occupied during the analysis. A careful measurement is made at each depth of receiver 24. This procedure is then repeated for a second position of transmitter 20 within the borehole. The measurements made during the profile tie are used to tie the individual profiles together.

An additional test conducted on the measurements is referred to as a reciprocity test. This reciprocity test involves exchanging the positions of transmitter 20 and receiver 24. It is preferred to measure reciprocity by establishing at least three positions at known depths, in the boreholes: shallow, intermediate and deep. Measurements are then made with transmitter 20 and receiver 24 in each position in each borehole. This involves measuring the data in the present logging position and then interchanging the transmitter 20 and the receiver 24 and making the measurements a second time. These measurements serve to test the depth control of system 19, as well as the stability and linearity of the signals propagating between transmitter 20 and receiver 24.

Although the foregoing has been described with only borehole 12a being lined with a conductive liner 16a, in practice either borehole 12a or 12b, or both may be lined. An analogous technique may be employed to determine the reduction in the magnetic field sensed by receiver 24 by conductive liner 16b. As before, the incident magnetic field induces a current in conductive liner 16b, which acts according to Lenz's law to reduce the magnetic field inside the borehole 12b. That is, conductive liner 16b shields receiver 24 from the incident magnetic field in a way similar to how conductive liner 16a shields and attenuates the magnetic field generated by transmitter 20.

SUMMARY OF THE INVENTION

In one aspect of the invention, a method is provided for conducting an electromagnetic induction survey of a geological formation penetrated by a borehole lined with a conductive casing. The method includes positioning a transmitter in the borehole, whereby the transmitter generates a transmitter magnetic moment, and positioning a distant receiver external of the borehole to detect a magnetic field induced by the transmitter, whereby the distant receiver is disposed across part of the formation from the borehole. Furthermore, an auxiliary receiver is positioned in the borehole proximate the transmitter to detect a magnetic field induced by the transmitter and attenuated by the conductive casing. Subsequently, a first casing attenuation factor that is applicable to the magnetic field measured by the auxiliary receiver is determined from a ratio of the measured magnetic field at the auxiliary receiver and the transmitter magnetic moment. A second casing attenuation factor applicable to the measurement of the magnetic field at the distant receiver is determined from a non-linear relationship (e.g., a power law relationship) between the first casing attenuation factor and the second attenuation factor, wherein the second attenuation factor is less than the first attenuation factor. Then, a formation attenuation factor applicable to the measured magnetic field at the distant receiver is determined from a relationship between the magnetic moment of the transmitter, the second casing attenuation factor, and the measured magnetic field at the distant receiver. Finally, the method correlates the determined value of the formation attenuation factor to a resistivity characteristic of the formation between the distant receiver and the transmitter.

In another aspect of the invention, a method is provided for conducting an electromagnetic induction survey of a geological formation penetrated by a borehole lined with a conductive casing. The method includes positioning a transmitter in the borehole, whereby the transmitter generates a transmitter magnetic moment and positioning a distant receiver external of the borehole to detect a magnetic field induced by the transmitter, whereby the distant receiver is disposed across part of the formation from the borehole. The method also includes positioning an auxiliary receiver in the borehole proximate the transmitter to detect a magnetic field induced by the transmitter and attenuated by the conductive casing, and positioning a second auxiliary receiver about the transmitter. With the second auxiliary receiver, the magnetic field immediately about the transmitter is measured and, from the values of the magnetic field measured by the first and second auxiliary receivers, values for the casing parameters of thickness, permeability, and density are obtained. From the values of the casing parameters, a value of a casing attenuation factor applicable to the measurement of the magnetic field at the distant receiver is further obtained. Then, a formation attenuation factor applicable to the measured magnetic field at the distant receiver is determined from a relationship between the magnetic moment of the transmitter, the casing attenuation factor, and the measured magnetic field at the distant receiver. Finally, the determined value of the formation attenuation factor is correlated to a resistivity characteristic of the formation between the distant receiver and the transmitter.

DETAILED DESCRIPTION

Figure 1:
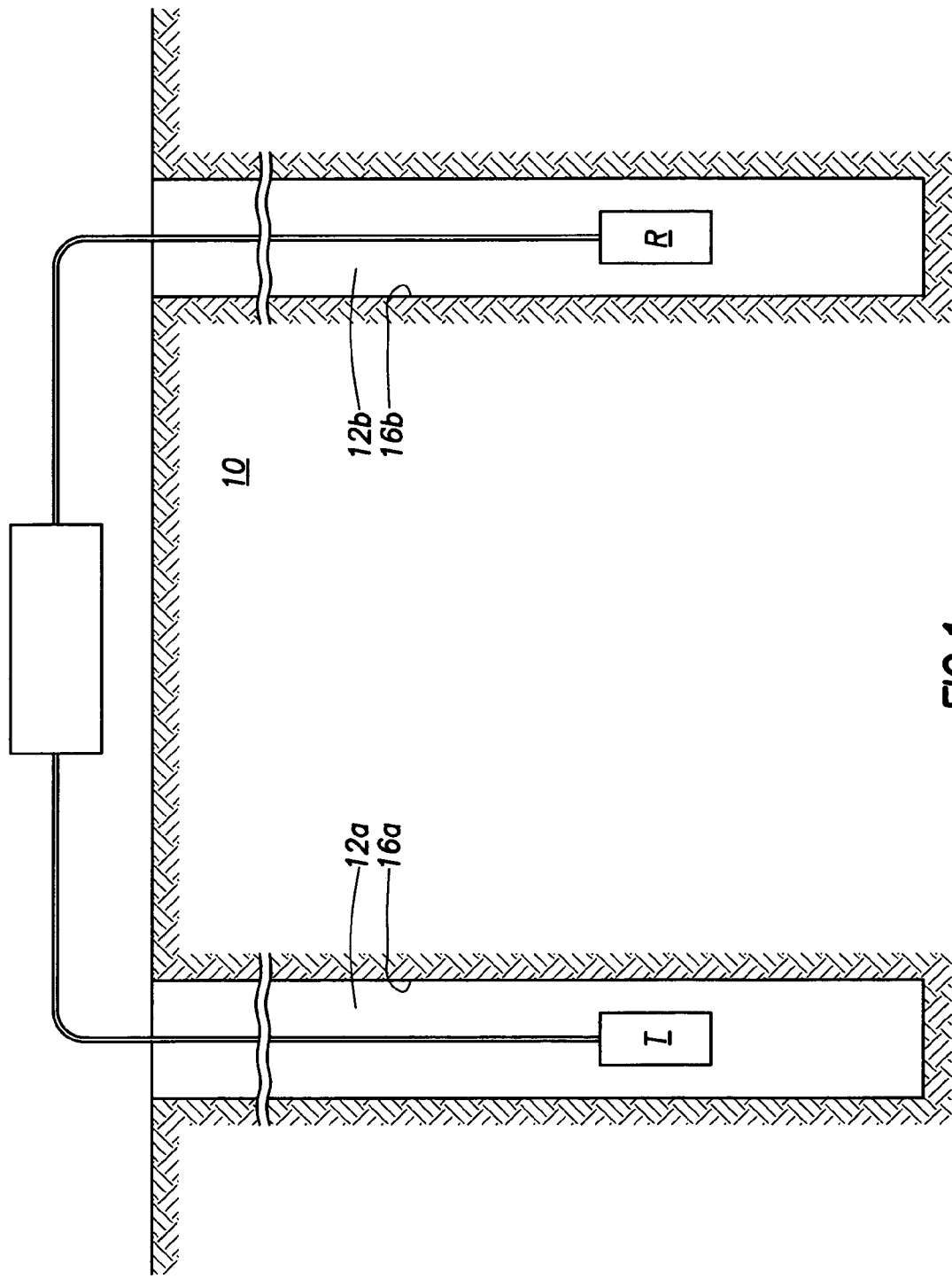
FIG. 1 is a schematic diagram illustrating a prior art cross-hole electromagnetic tomography system.
Figure 2:
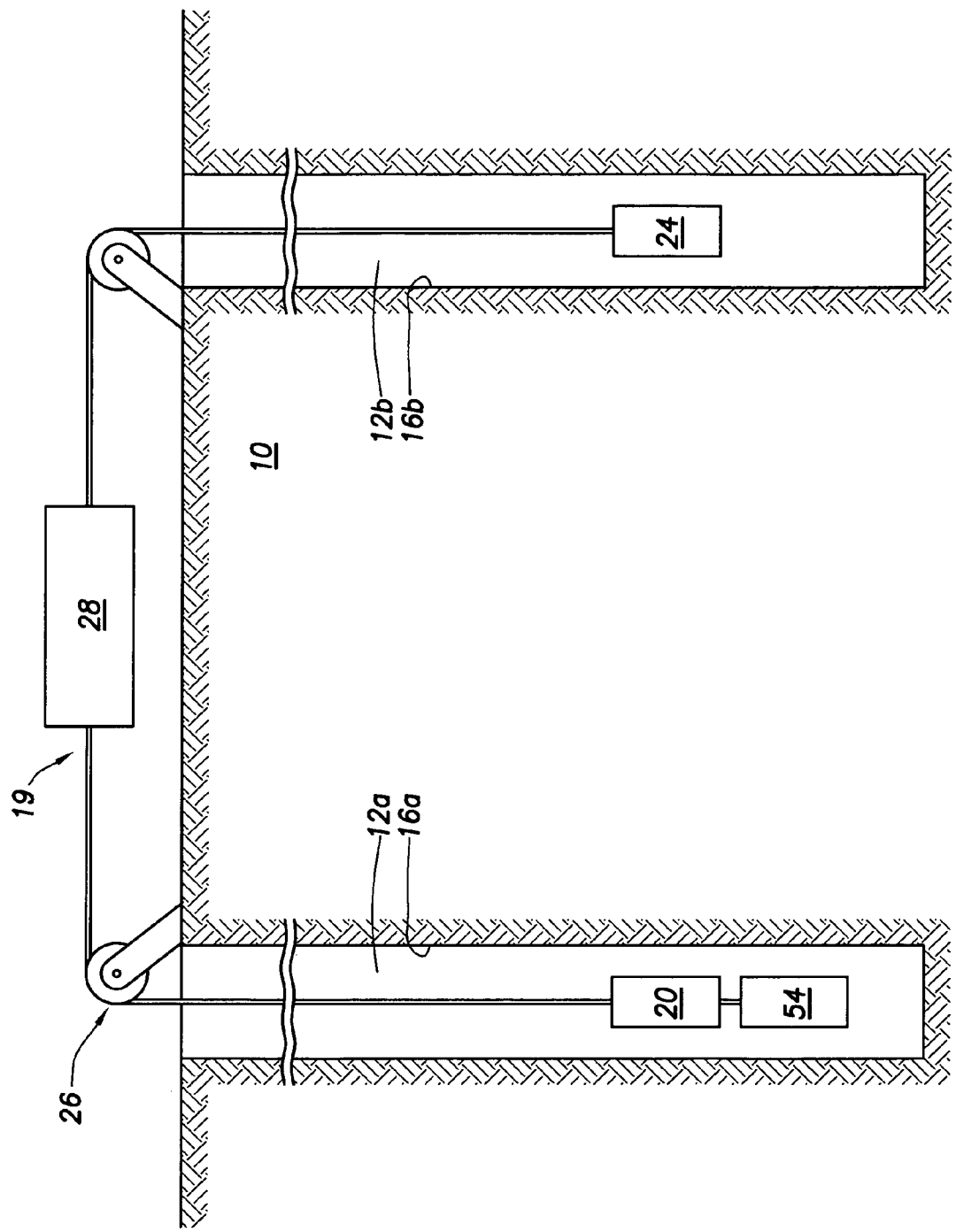
FIG. 2 is a schematic diagram of an electromagnetic tomography system according to the present invention.

Embodiments of the present invention utilize an auxiliary receiver, an auxiliary transmitter, or both to facilitate the correction of shielding effects of conductive casings. In one embodiment, as shown in FIG. 2, a system 19 employed to analyze the geological formation 10 includes a transmitter 20 disposed in borehole 12a and a receiver 24 disposed in a borehole 12b. Alternatively, transmitter 20 and receiver 24 may be disposed in the same borehole for single borehole tomography (not shown). For purposes of the present description, system 19 may be referred to as an electromagnetic tomography system or a system for conducting electromagnetic induction surveys.

The transmitter 20 typically comprises multi-turn wires wound around a magnetically permeable (e.g., mu-metal or ferrite) core and other electronic control components (e.g., a capacitor); (not shown). The receiver 24 typically comprises more than one antenna (not shown). These antennas may point to the x, y, and z directions, respectively, to detect different magnetic field components. These antennas similarly comprise multi-turn wires wound around magnetically permeable metal cores so that an external magnetic field will induce a current to flow through the wire(s). The receiver 24 also comprises other electronic components (not shown) to detect the current (or voltage) thus induced. It will be appreciated by those skilled in the art that other types of antenna configurations may be used to implement the invention (e.g., saddle coils, segmented antennas, tri-axial antennas, etc.). Transmitter 20 and receiver 24 may be deployed using standard seven conductor wireline winches, cables, and standard seven-pin Gerhard-Owens cable connectors, shown generally as 26. System 19 may be operated using a computer (not shown) included in surface station 28, which is in data communication with transmitter 20 and receiver 24.

Table 1 shows various operational parameters of a representative transmitter. Note that this is but one example; different transmitters with different physical characteristics will have different operational parameters. As shown in Table 1, this transmitter provides large magnetic moments at low (alternating current) frequencies where the inductive reactance of the transmitter is small. This reactance increases with the frequency; as a result, the magnetic moment of the transmitter decreases. That higher frequencies produce lower magnetic moments is generally true with any transmitter; this is not unique to this particular transmitter. However, higher frequencies afford better resolution of maps of geological formations. Therefore, in practice, it is often desirable to find a compromised (optimum) frequency for the analysis of a geological formation. The optimum operating frequency depends on the borehole separation and formation resistivity. Too low a frequency limits the resolution, while too high a frequency reduces the effective transmitter magnetic moment, hence the range of detection. Table 1 shows that reduction in the transmitter moment becomes more significant at frequencies of 90 Hz and above. It is apparent from Table 1 that this transmitter will provide sufficient moments at frequencies below 370 Hz. However, if conductive casings are used, it will be necessary to operate the transmitter at an even lower frequency because conductive casings act as low-pass filters.

TABLE 1

| | | Typical Receiver Noise | |
|---|---|---|---|
| Frequency | Max Moment | $B_z$ noise (fT) | $B_x$ noise (fT) |
| 1 | 3000 | 30 | 80 |
| 5 | 3000 | 25 | 60 |
| 10 | 3000 | 15 | 50 |
| 24 | 3000 | 12 | 50 |
| 45 | 2800 | 8 | 25 |
| 90 | 2100 | 5 | 18 |
| 190 | 1600 | 3 | 15 |
| 370 | 900 | 3 | 15 |
| 759 | 300 | 6 | 15 |
| 1848 | 180 | 9 | 15 |

As discussed above, a receiver may include multiple antennas (not shown), pointing to the x, y, and z directions, respectively, with the z direction being along the axis of the borehole. Due to geometric constraints, the antennas in the x and y directions are not as long as that in the z direction. As a result, the z antenna is more sensitive, i.e., the field ($B_z$) sensed by the z antenna typically has lower noise than that sensed by the x or y antenna (see $B_x$ in Table 1).

The range of operation for an electromagnetic tomography system (e.g., system 19 in FIG. 2) and the operating procedures are somewhat dependent on the formation resistivity and the presence (or absence) of conductive well casing (16a and 16b in FIG. 2). Using transmitters and receivers commonly available in the art, a typical system may have a maximum range of about one kilometer in fiberglass cased wells or open holes (i.e., in the absence of conductive casing). This range is reduced to approximately 400 meters if one of the wellbores is cased with conductive materials. Assuming a maximum tool separation of approximately 1 kilometer, the borehole separation should probably be no more than 650 meters so that transmitter 20 and receiver 24 will remain within the maximum separation of 1 kilometers when they travel up and down the boreholes.

Before commencing analysis of geological formations, a desired frequency of operation should be selected. Because higher frequencies produce better resolution in the images of the formations, the desired operating frequency typically would be the highest frequency with which reliable data may be collected over the entire profile length (the axial length of the borehole). This frequency may be established based on two simple relations: the primary field relation and the skin depth equation.

The primary magnetic field is the field present in the absence of a geological formation for the vertical magnetic field ($B_z$) (from equation 2a with the x and z axes interchanged) when transmitter 20 and receiver 24 are positioned at the same vertical level. The vertical magnetic field, $B_z$ may be expressed by $$B_z = \frac{100M}{R^3} \quad (7)$$

where M is the transmitter moment in A.m², R is the separation between the boreholes in meters, and $B_z$ is the vertical (z direction) magnetic field in nano Teslas (nT, $10^{-9}$ T). This equation may be used as a rough estimate when vertical levels of transmitter 20 and receiver 24 differ somewhat.

The skin depth ($\delta$) is defined as the distance through which an electromagnetic plane wave of frequency f propagates before attenuation to 1/e (0.37) of its initial amplitude. At two skin depths, the attenuation is $1/e^2$ (0.135), and at four skin depths, it is $1/e^4$ (0.018). While this relationship is not strictly applicable at locations close to the transmitter, it is an approximate measure of how much of a supplied primary field is converted into the induced currents, which in turn produce the secondary fields required for electromagnetic imaging. The skin depth ($\delta$) is a function of the formation resistivity $\rho$ and the electromagnetic wave frequency f. Thus, skin depth $\delta$ may be defined approximately as follows:

$$\delta \approx 500 \sqrt{\frac{\rho}{f}} \quad (8)$$

where $\rho$ is the resistivity (in Ohm·m) of the formation.

From equations (7) and (8) and the source moment, the approximate field level at any cross-hole distance can be estimated. For example, assuming a separation of 200 m between boreholes and a transmitter magnetic moment of 1000, the maximum primary field (when transmitter 20 and receiver 24 are at the same vertical level) from Equation 7 is 0.0125 nT. This is well above the receiver noise for any frequency of operation (see Table 1).

During operation, transmitter 20 and receiver 24 are positioned at various vertical levels above, within, and below the area of interest. Thus, transmitter 20 and receiver 24 will typically be separated by a distance more than that between the boreholes. For a borehole separation of 200 meters, transmitter 20 and receiver 24 might be separated up to 400 meters during operation. At a diagonal separation of 400 meters between transmitter 20 and receiver 24, equation (7) shows that the primary field would be reduced to approximately 0.0016 nT, which is still above the receiver noise for any frequency of operation (see Table 1).

Equation (8) indicates that at a transmitter frequency of 200 Hz and a formation resistivity of 8 Ohm·m, the skin depth of the transmitter moment is about 100 meters $$\left(\delta = 500 \sqrt{\frac{8}{200}} = 100\right).$$

Therefore, the borehole separation (200 m) in the above example is about twice the skin depth, and so the field (0.0125 nT as calculated above) would be further attenuated by the formation by a factor of 0.135 to 0.0017 nT, when transmitter 20 and receiver 24 are at the same level. If transmitter 20 and the receiver 24 are not at the same level, the field would be further attenuated by the increased separation between them; for example, by a factor of 0.018 when transmitter 20 and receiver 24 have a diagonal separation of 400 m (four times the skin depth). Thus, at a diagonal separation of 400 m, the field strength will be about $2.8 \times 10^{-5}$ nT or 28 fT (0.0016 nT×0.018=$2.8 \times 10^{-5}$ nT), which is only a few times the noise level at 200 Hz (about 3 fT, see Table 1). This calculation indicates that a diagonal separation of about 400m between transmitter 20 and receiver 24 may be approaching the maximum range under the circumstances (i.e., 200 Hz transmitter frequency and 8 Ohm·m formation resistivity).

As a general rule, an operating frequency is chosen by using the skin depth relation defined by equation (8) such that it will produce a skin depth about half the distance between the boreholes. In other words, the separation between the boreholes should generally be twice the skin depths. This is shown quantitatively as follows:

$$\text{Separation, } R, = 2\delta = 1000 \sqrt{\frac{\rho}{f}} \quad (9)$$

-continued $$\text{So,} \quad f = 10^6 \frac{\rho}{R^2} \quad (10)$$

where R is the separation between the boreholes in meters and ρ is the formation resistivity in Ohm·m. Once a frequency is selected by using equation (10), the magnetic moment for the transmitter will be known. With the magnetic moment, the magnetic field level can then be estimated using equation (7). This magnetic field will be multiplied by the attenuation factor as described above to estimate the minimum field for the farthest diagonal separation between the receiver and the transmitter. If the minimum field is above the system noise level (e.g., those shown in Table 1), then the frequency is suitable. If the minimum signal level falls below the system noise level, the operating frequency should be reduced. It is preferred to reduce the frequency than to collect incomplete data profiles.

If one of the boreholes (e.g., 12a) is cased with a conductive liner (e.g., 16a; see FIG. 3), calculations should include casing attenuation effects because, as discussed previously, a conductive liner effectively "shields" a transmitter from a receiver. The transmitter moment is effectively reduced by a casing attenuation factor $k_c$ (or casing response factor) so that the effective moment seen by the receiver at some distance away can be expressed as:

$$M_{eff} = k_c M_T \quad (11)$$

Table 2 provides estimates of the signal attenuation due to a "typical" oil field conductive liner (e.g., steel casing). To use this table, one multiplies the expected field by the corresponding attenuation factor ($k_c$) given in the table. Using the example discussed above, it is found that the liner attenuation at 190 Hz is 0.005, and about 0.004 at 200 Hz. The minimum expected vertical magnetic field ($B_z$) from the above example (at 200 Hz), therefore, can be determined using the equation: $B_z \approx 0.0016 \times 0.004 \approx 6.4 \times 10^{-6}$ nT (or 6.4 nT). Note that this value is approaching the noise level listed in Table 1, and it would be preferred to decrease the operating frequency to a lower frequency (e.g., 90 Hz).

TABLE 2

| Frequency | Attenuation |
|---|---|
| 1 | 1.0 |
| 5 | .9 |
| 10 | .6 |
| 24 | .3 |
| 45 | .1 |
| 90 | .08 |
| 190 | .005 |
| 370 | .001 |
| 759 | .00001 |
| 1848 | .0000001 |

In addition to general attenuation, the conductive casings present further problems because they are often not perfectly homogenous. For example, the properties of the casing may vary from one depth to another. As discussed above, such inhomogeneity may render the prior art correction methods impractical. In accordance with the present invention, the effects of such casing inhomogeneity is mitigated by providing an auxiliary receiver 54 in the proximity of transmitter 20 (see FIG. 2). Auxiliary receiver 54 permits detection of a magnetic field, $B_a$, the characteristics of which is dependent primarily on the casing properties (not on the formation properties). The magnetic field $B_a$ at auxiliary receiver 54 can then be used to correct for casing attenuation effects in the magnetic field that is induced in receiver 24. Specifically, a magnetic field $B_a$ is induced in the auxiliary receiver 54. The magnetic field $B_a$ is related to the magnetic moment $M_T$ of transmitter 20, a casing attenuation factor $k_T$, and a geometric factor a (taken from equation (2a)). This relation is expressed as follows:

$$B_a = a k_T M_T \quad (12)$$

The casing attenuation factor, $K_T$ is a function of the properties of conductive liner 16a. Because auxiliary receiver 54 is inside liner 16a and in close proximity (e.g., $\leq 2$ m) to transmitter 20T, the magnetic field $B_a$ sensed by auxiliary receiver 54 is dominated by the properties of the conductive liner 16a. Close proximity refers to a distance within which the magnetic field sensed by auxiliary receiver 54 is influenced primarily by the conductive casing and not by the formation. This distance is typically less than a few meters from transmitter 20. In contrast, if auxiliary receiver 54 is far away (e.g., $\geq 10$ m) from transmitter 20, the magnetic field sensed by auxiliary receiver 54 will also depend on the formation properties.

With a fixed separation between auxiliary receiver 54 and transmitter 20, $K_T$ becomes a function of only the conductive casing properties or casing parameters (e.g., radius $r_l$, thickness $t_c$, conductivity σ, and permeability μ). Presumably, the factor $K_T$ could be calculated given the properties of conductive liner 16a and the dimensions and properties of transmitter 20. In respect to one method according to the invention, $K_T$ does not need to be accurately determined, nor does it have to reflect variations in the properties of an inhomogeneous liner. The factor $K_T$ is generally obtained from ratio of the magnetic field $B_a$ measured by the auxiliary receiver and the transmitter moment $M_T$ known for the transmitter 20. The magnetic moment $M_T$ is known since the current in the transmitter is measured accurately as part of the whole system operation and the geometric factor a is also known from the fixed geometry of the transmitter-receiver structure. Once $K_T$ is determined, the effects of the properties of conductive liner 16a may be compensated for when sensing a magnetic field with a receiver disposed far ($\geq 10$ m) away from transmitter 20. Note that this receiver could be a receiver (not shown) disposed in the same borehole 12a or a receiver (e.g., receiver 24) disposed in borehole 12b. In other words, embodiments of the invention are applicable in either single borehole or cross-borehole tomography.

Accordingly, in one aspect of the invention, measurement of the magnetic field $B_a$ at the auxiliary receiver 54 (adjacent the transmitter 20) provides a measure of casing attenuation. This measurement is used to predict the casing attenuation affecting the reading of the distant receiver. The measured field at the distant receiver can then be corrected and the undistorted field recovered. In more detail, the measured field at the distant receiver is given by equation 2:

$$B_R = b k_f M_{eff} \quad (13)$$

where $M_{eff}$ is the moment attenuated by the casing attenuation factor $k_c$, so that in general $$B_R = b k_f k_c M_T \quad (14)$$

In accordance with the present invention, $k_T$ and $k_c$ are determined to be functions of the casing parameters alone and are simply related. By determining the relationship between $k_T$ and $k_c$, the measurement of the field at the auxiliary receiver, $B_a$, may be used to predict the casing attenuation factor $k_c$ at the distant receiver and, in turn, to recover the desired formation factor, $k_f$.

In more detail, suppose that $k_c$ is a function of $k_T$, e.g. $k_c=F(k_T)$. Now the field at the auxiliary receiver is given by $B_a=ak_T M_T$, so $k_T=B_a/aM_T$ and thus $$k_c=F(B_a/aM_T) \quad (15)$$

So, the measured magnetic field at a distance from the first borehole becomes:

$$B_R=bk_f F(B_a/aM_T)M_T \quad (16)$$

Since $M_T$, a, and b are known (by direct application of equation 2a and a knowledge of the spatial locations of the auxiliary and distant receivers), the desired formation factor $k_f$ can be determined from the measured magnetic field.

In an earlier application, Applicants made the assumption that the functional relationship between $k_T$ and $k_c$ is linear, i.e. $k_T=\beta k_c$. In practice, this assumption, that the ratio of $k_c/k_T$ is a constant, does work to reduce the effects of casing variations in the predictions of $B_R$. Residual casing effects (due to casing variations) remain, however, and distorts the predictions of $B_R$. Consequently, errors in the computation of $k_f$ are introduced.

In accordance with one method according to the invention, the functional relationship between $k_c$ and $k_T$ that is employed is a power law relationship, i.e. $k_c=(k_T)^\beta$. Applicants observe that the magnetic field outside the first casing is attenuated by an initial complex factor, $k_c$. In respect to the reading by auxiliary receiver 54, this magnetic field is again attenuated as it reenters the casing near the auxiliary receiver. As an approximation, it may be assumed that the magnetic field is attenuated the second time, by the same factor, $k_C$. Thus, the resulting attenuation factor $k_T$ of the magnetic field detected by the auxiliary receiver may be expressed as:

$$k_T=k_c^2 \text{ or } k_c=k_T^{0.5} \quad (17)$$

From the above expression for $k_T$, the casing attenuation factor, $k_C$ may be further expanded as the square root of $k_T$ or $k_C=k_T^{0.5}$. From the reading of $B_a$, $B_R$ may be expressed as:

$$B_R=bk_f k_T^{0.5} M_T \quad (18)$$

Because $M_T$ is known and auxiliary receiver 54 provides a measurement of $B_a$, $k_T$ (and $k_T^{0.5}$) is determined from the relationship, $k_T=B_a/aM_T$. This allows for the casing attenuation factor, $k_C$ to be determined directly from $k_T$ and then plugged into the equation above for $B_R$. Accordingly, the formation attenuation factor, $k_f$, may be determined from the reading of the magnetic field, $B_R$, by the distant receiver, 24. As is generally known to those skilled in the relevant art, the formation attenuation factor $k_f$ provides a measurement or indication of the electrical resistivity of the formation between the boreholes 16a, 16b.

In yet another preferred embodiment of the invention, an improved, more accurate relationship between $k_C$ and $k_T$ is determined and employed. By way of numerical modeling techniques, Applicants have determined that the relationship between $k_C$ and $k_T$ employed above ($k_C=k_T^{0.5}$) is an approximation that may still afford room for improvement. After further analysis, Applicants concluded that the value of the exponent $\beta$ depends on the value of the product of certain casing parameters: conductivity ($\sigma$), permeability ($\mu$), and thickness (t). This product is referred to as the induction number, $\Theta$. In a further aspect of the inventive method, a rough measure of $\Theta$ is derived from the actual measurement of the magnetic field, $B_a$, by the auxiliary receiver 54. As can be appreciated by those skilled in the relevant art, the measurement of magnetic field $B_a$ has both a real and an imaginary component. In accordance with the present method, the value of the induction number $\Theta$ is correlated with the phase of $B_a$. Specifically, a rough measure of $\Theta$ is derived from the phase of the measured magnetic field $B_a$.

Figure 4A:
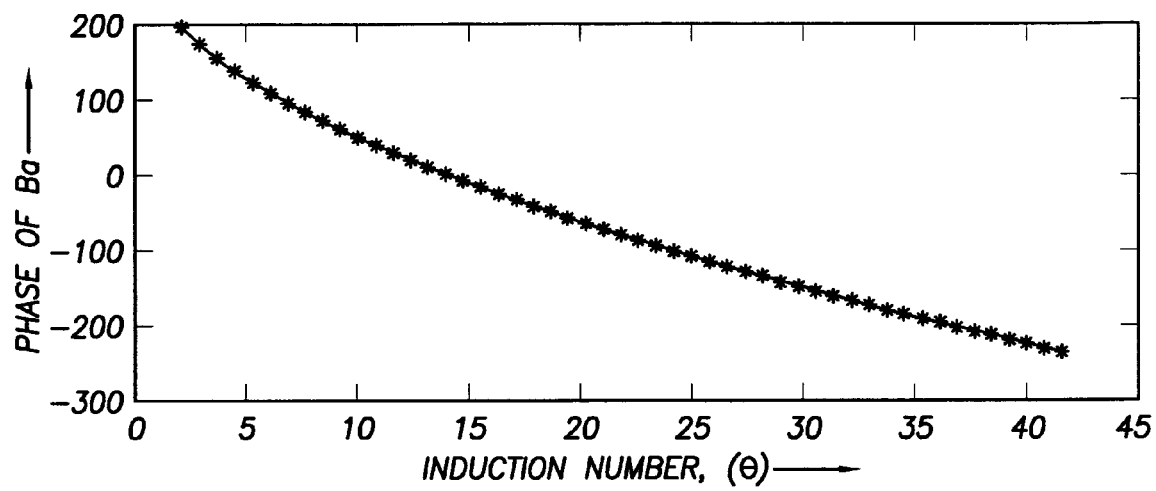
FIG. 4a illustrates a plot of induction numbers for a typical conductive casing and the phase of a magnetic field induced in an auxiliary receiver within the conductive casing in a borehole, according to the present invention.

FIG. 4a is a plot of the phase of $B_a$ as a function of $\Theta$ for a wide range of $\sigma$, $\mu$, and t values (values typical of casings). The plot reveals that the phase of $B_a$ is a smooth function of the induction number, $\Theta$. In the preferred implementation of the method, the phase of the measured $B_a$ field is used to determine an approximate value of $\Theta$. Preferably, a master table is already generated of $\Theta$ values (i.e., different combinations of $\sigma$, $\mu$, and t) for expected ranges of value of the phase of $B_a$. This table may be generated for a variety of common casing types. Upon a reading of the magnetic field $B_a$ or, more particularly, the phase of $B_a$, the value for $\Theta$ is readily obtained from the master table (typically stored in a computer database and accessed via a computer program).

Figure 4B:
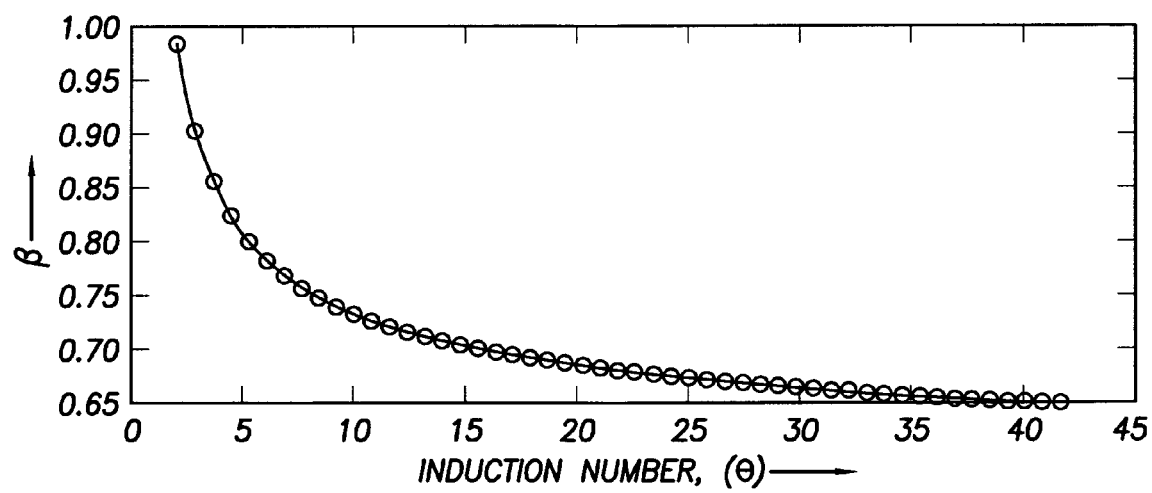
FIG. 4b illustrates a plot of induction numbers for a typical conductive casing and the value of an exponent in a power law relationship used to determine a casing attenuation factor, according to the present invention.

Next, the value of $\Theta$ is used to determine $\beta$ in the relation $k_C=k_T^\beta$. This step is performed empirically by way of a numerical algorithm for computing $k_C$ and $k_T$ for a given casing. The 'best' value for $\beta$ is found iteratively. In other words, a value of $\beta$ is found which makes $k_C/k_T^\beta$, close to one over a small range of $\sigma$, $\mu$, and t around the induction number, $\Theta$. The 'best' value of $\beta$ is then applied to predict $k_c$ and hence determine $k_f$. FIG. 4B provides a plot $\beta$ vs $\theta$. for a typical, exemplary casing.

In yet another approach to addressing the casing variations effects (in crosshole electromagnetic surveys), a measurement is taken of the magnetic field threading the transmitter as well as the magnetic field, $B_a$, at the auxiliary receiver 54, $B_a$. From the two measurements, relatively accurate values of $\sigma$, $\mu$, and t of the casing may be determined from which the value of $k_C$ may be obtained.

Figure 5:
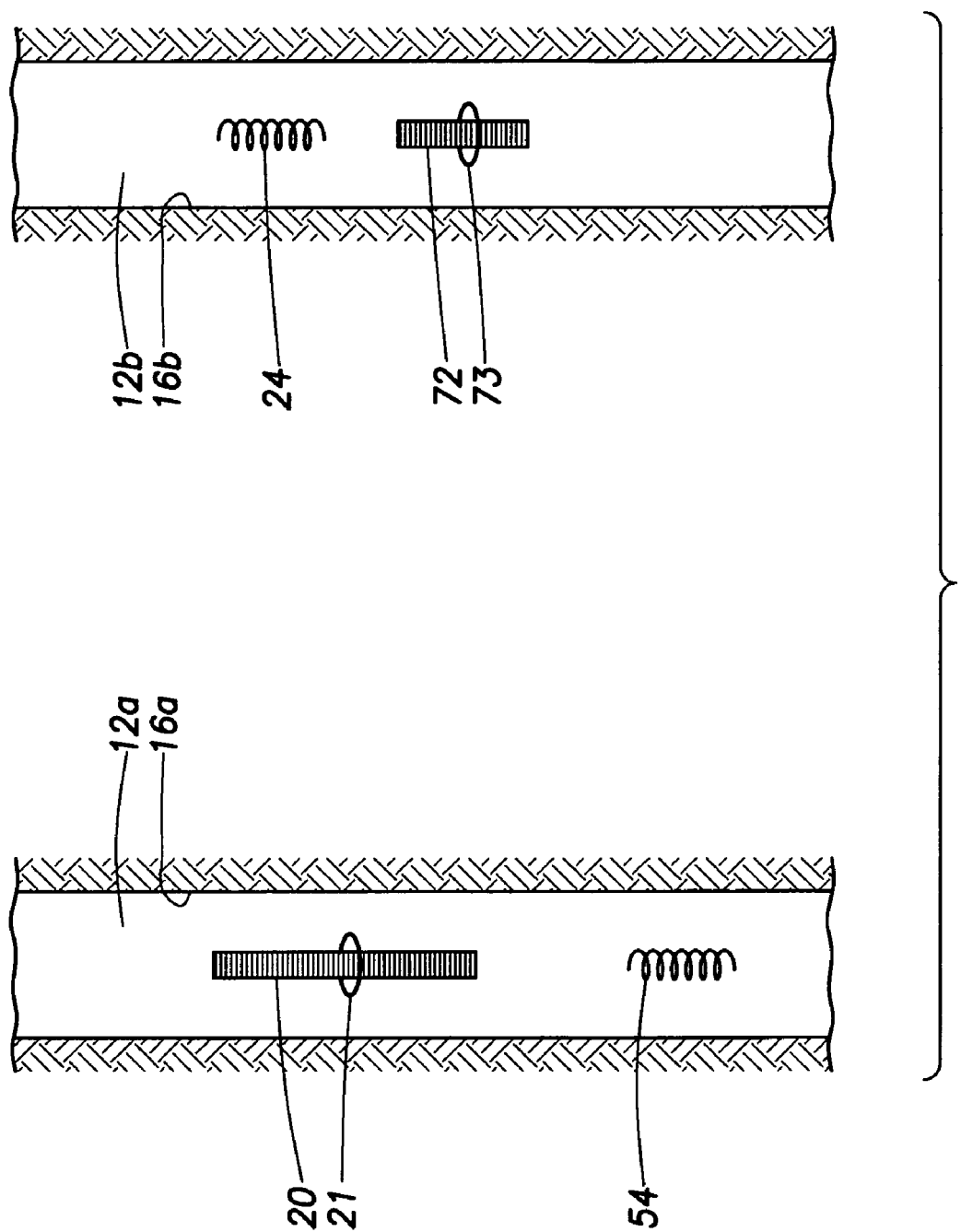
FIG. 5 is a schematic diagram of another alternative electromagnetic tomography system, according to the present invention.

Referring to the alternate system illustrated in FIG. 5, the magnetic field threading the transmitter is measured by encircling the transmitter 20 coil or solenoid with several turns of wire, (i.e., another receiver) as shown by the single turn 21. Like the receivers described above, (e.g., auxiliary receiver 54) the voltage developed across this coil is proportional to the time rate of change of flux within it. In this description, the magnetic field measured by this 21 receiver is referred to as $B_T$.

Figures 6A, 6B:
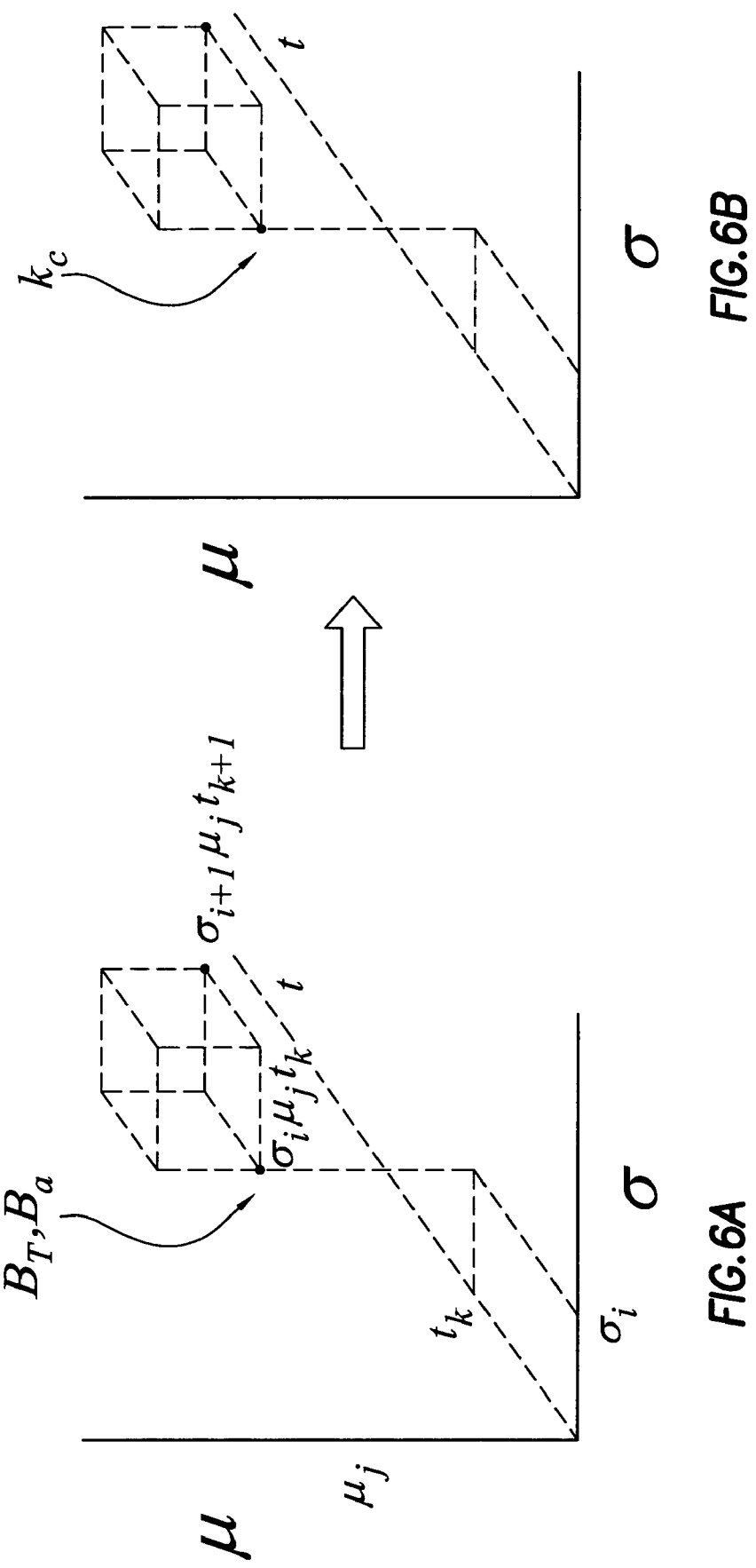
FIG. 6A is a graphical illustration of a master table of casing parameters of a typical conductive casing for pairs of measured magnetic fields induced within the borehole, as utilized by a electromagnetic induction survey method according to the present invention.
FIG. 6B is a graphical illustration of a master table of casing attenuation factors for sets of casing parameters, as utilized by a electromagnetic induction survey method according to the present invention.

In accordance with this variation of the inventive method, the casing attenuation factor $k_C$ is determined without actually computing values of $\sigma$, $\mu$ and t. The casing attenuation factor, $k_C$, is obtained directly from the measurement of $B_a$ and $B_T$. Preferably, the determination of $k_c$ is performed by way of a numerical analysis technique:

In an exemplary method, a three dimensional table is constructed of computed $B_a$ and $B_T$ values for the entire range of $\sigma$, $\mu$ and t values likely to be encountered. Such a table may be generated for a variety of common casing types and of a specific radius. FIG. 6A is a graphical illustration of a typical pair of $B_a$ and $B_T$ values for a particular set, $\sigma_i \mu_j t_k$, of casing parameters. The values of $B_a$ and $B_T$ are calculated at a succession of points in $\sigma$, $\mu$ and t spaced at intervals sufficiently small so that the fields vary linearly between points in the table. The result is a three dimensional mesh or table of the values of $B_a$ and $B_T$ for any value of $\sigma$, $\mu$ and t. This is referred to as the master casing parameteres table. The table need only to be calculated only once for the entire range of anticipated casing parameters and for the fixed spacing of the auxiliary receivers and chosen operating frequencies. Adjacent points in $\sigma$, $\mu$ and t space define an elemental rectangular volume. The values of $B_a$ and $B_T$ at an arbitrary value of σ, μ and t within this elementary volume can be obtained by linear interpolation between the values on the vertices of the elementary volume. Conversely the values of σ, μ and t may be linearly interpolated for a specified pair of $B_a$ and $B_T$ within the volume.

Referring to FIG. 6B, the values of $k_c$ are entered in a second three dimensional table for the same set of σ, μ and t values used to create the master casing parameters table. FIG. 6B provides a graphical illustration of this second table.

Thus, in accordance with the inventive method, measured values $B_a$ and $B_T$ are obtained from auxiliary receiver 54 and second auxiliary receiver 21, respectively. Then, given the pair of $B_a$ and $B_T$ values, the master table is iteratively searched, interpolating as necessary to locate the corresponding σ, μ and t values. Given the σ, μ and t values, the value of the casing attenuation factor, $k_C$, for that set of σ, μ and t values is obtained from the second table. Lastly, the formation factor $k_f$ is obtained from the measured magnetic field $B_R$ and the known values of $M_T$, b, and $k_C$.

The method is made relatively fast, through use of computer means and database embodying the first and second table. The range of casing parameters is typically $10^6$ to $10^7$ S/m for σ, 20 to 200 for μ and 0.3 to 0.7 in. for t. The values of $B_a$ and $B_T$ are slowly varying functions of σ, μ and t, so it is only necessary to have 10 points per decade for the σ and μ values and perhaps 5 or 6 values spanning the range of t. There are consequently less than a thousand points in the master table. Accordingly, determination of the correction factor $k_c$ is essentially instantaneous.

Figure 3:
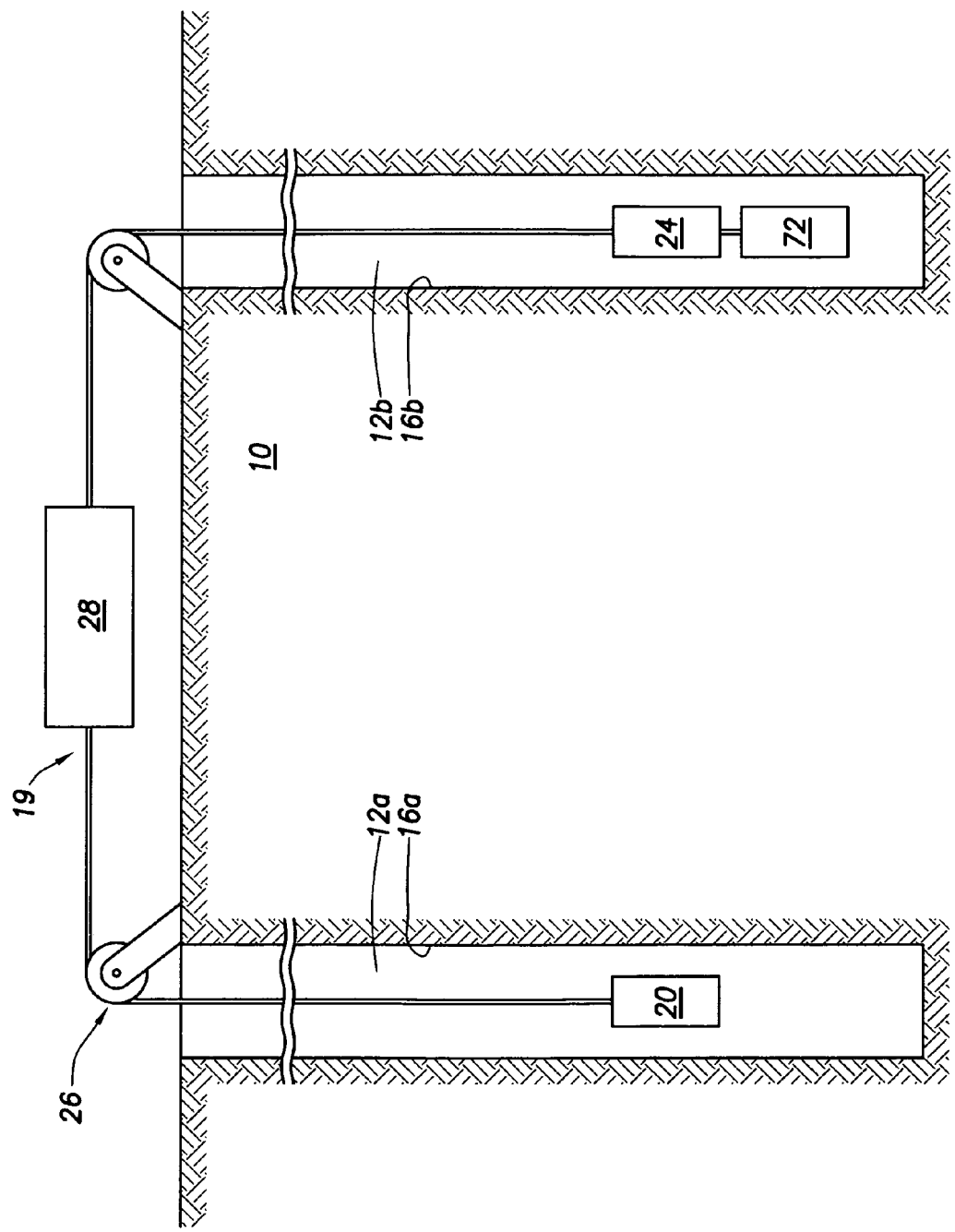
FIG. 3 is a schematic diagram of an alternative electromagnetic tomography system according to the present invention.
Figure 7:
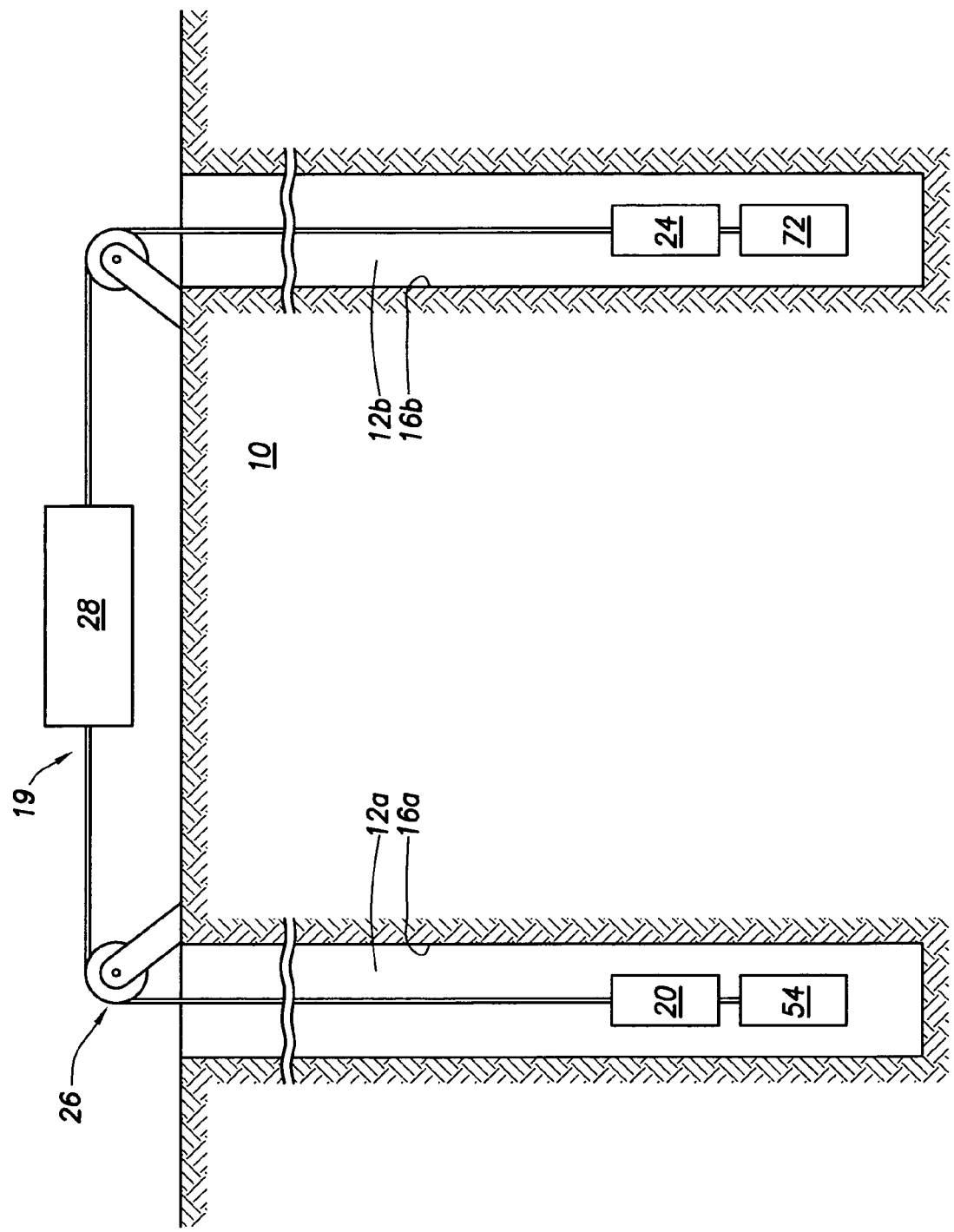
FIG. 7 is a schematic diagram of yet another alternative electromagnetic tomography system according to the invention.

While the embodiments shown in FIG. 2 and FIG. 3 are for single-hole cased applications, the embodiment illustrated in FIGS. 6 and 7 can be used when both boreholes 16a, 16b are cased with conductive materials. The field measured at a receiver within a cased borehole, $B_R$, now has an additional attenuation factor $k_r$ so that the measured field becomes:

$$B_R = bk_f k_c k_r M_T \qquad (19)$$

In this embodiment, system 19 includes both an auxiliary receiver 54 and an auxiliary transmitter 72 (see FIG. 7). Auxiliary receiver 54 can be used to correct the effects of the inductive liner 16a, while auxiliary transmitter 72 can be used to correct the effects of the inductive liner 16b. Like the placement of the auxiliary receiver 54, the auxiliary transmitter must be placed close enough to the receiver, e.g. within a meter or two, so that the magnetic field at the receiver depends only on the casing and not on the formation. The procedures for performing such corrections are the same as described above.

In the system of FIG. 5, the second borehole 12b is a second conductive casing 16b. Preferably, the borehole 12b is further equipped with a second transmitter 72 placed adjacent the distance receiver 24. Further, the second transmitter 72 is encircled by another receiver 73 similar in configuration and function to receiver 21 in the first borehole 12a. In this case, the magnetic field measured at receiver 24, $B_d$, from auxiliary transmitter 72 and the field measured by the receiver 73 encircling the auxiliary transmitter, 72, $B_g$, are sufficient to define σ, μ and t of the casing 16b. The values for these properties in turn serve to predict the casing attenuation factor $K_r$ at the receiver 24.

The casing attenuation factor $k_r$ is computed each time the receiver is placed at a new position in borehole 16b and before the transmitter 20 is activated. The correction is then applicable to all the readings of receiver 24 as the transmitter 20 is moved over its range of depths in borehole 16a.

The magnetic field data obtained from the tomography are used in electromagnetic (EM) modeling to derive the resistivity distribution between the boreholes. EM modeling may employ approximate methods for forward solutions or use a least square inversion technique to fit the data. These techniques are well known in the art, and any such technique may be used. In this process, it may be more convenient to assume a cylindrical symmetry and Born approximation (low contrast scattering). Alternatively, a two-dimensional rectangular geometry may be assumed and more general low scattering assumption may be included. In one method, a three-dimensional EM modeling is used, though this approach requires more computer resources.

While the invention has been described using a limited number of embodiments, those skilled in the art, having the benefit of this disclosure, will appreciate that other variations are possible without departing from the scope of the invention as disclosed herein. Accordingly, the scope of the invention should be limited only by the attached claims.

What is claimed is:

1. A method of conducting an electromagnetic induction survey of a geological formation penetrated by a borehole lined with a conductive casing, said method comprising the steps of:

positioning a transmitter in the borehole, whereby the transmitter generates a transmitter magnetic moment;

positioning a distant receiver external of the borehole to detect a magnetic field induced by the transmitter, whereby the distant receiver is disposed across part of the formation from the borehole;

positioning an auxiliary receiver in the borehole proximate the transmitter to detect a magnetic field induced by the transmitter and attenuated by the conductive casing;

determining a first casing attenuation factor applicable to the magnetic field measured by the auxiliary receiver from a ratio of the measured magnetic field at the auxiliary receiver and the transmitter magnetic moment;

determining a second casing attenuation factor applicable to the measurement of the magnetic field at the distant receiver from a non-linear relationship between the first casing attenuation factor and the second attenuation factor, wherein the second attenuation factor is less than the first attenuation factor;

determining a formation attenuation factor applicable to the measured magnetic field at the distant receiver from a relationship between the magnetic moment of the transmitter, the second casing attenuation factor, and the measured magnetic field at the distant receiver; and correlating the determined value of the formation attenuation factor to a resistivity characteristic of the formation between the distant receiver and the transmitter.

2. The method of claim 1, wherein said step of determining a second casing attenuation factor accounts for attenuation of the magnetic field by the conductive casing as the magnetic field exits the conductive casing proximate the transmitter and attenuation of the magnetic field by the conductive casing as the magnetic field reenters the conductive casing proximate the auxiliary receiver.

3. The method of claim 1, wherein said step of positioning the distant receiver includes positioning the second receiver a second borehole.

4. The method of claim 3, wherein said step of determining a second casing attenuation factor employs a power law relationship with an exponent having a value between about 0.5 and about 0.7.

5. The method of claim 1, wherein said step of determining the second casing attenuation factor includes employing a power law relationship wherein an exponent is derived from the phase of the measured magnetic field at the auxiliary receiver.

6. The method of claim 5, wherein said step of determining the second casing attenuation factor includes determining the exponent from a product of a plurality of casing parameters and determining the product from the phase of the measured magnetic field at the auxiliary receiver.

7. The method of claim 6, wherein said step of determining the second casing attenuation factor includes generating a first table of values of the product for an array of values of the phase of the measured magnetic field at the auxiliary receiver and generating a second table of exponent values for an array of values of the product, such that the product is obtained from the first table given the phase value and the exponent value is obtained from the second table given the product value.

8. The method of claim 7, further comprising the step of generating said first and second tables for a set of casing types, wherein said step of determining the second casing attenuation factor includes selecting a first table and a second tables based on the type of conductive casing.

9. The method of claim 6, wherein the casing parameters are density, permeability, and casing thickness.

10. The method of claim 9, further comprising the steps of:
generating a first database of induction numbers for an array of values of the phase of the magnetic field measured at the auxiliary receiver, wherein the induction number is a product of a plurality of casing parameters consisting of density, permeability, and casing thickness; and
generating a second database of exponent values for an array of induction numbers; and
wherein said step of determining the second casing attenuation factor includes
determining the phase of the measured magnetic field at the auxiliary receiver;
from the first database, obtaining an induction number based on the phase;
from the second database, obtaining an exponent value based on the induction number; and
determining the second casing attenuation factor from the power law relationship having the exponent value.

11. The method of claim 10, wherein each of the first and second databases is stored in a computer database and said obtaining steps are implemented by executing a computer program accessing the computer databases.

12. The method of claim 1, wherein said steps of positioning a transmitter and positioning an auxiliary receiver are repeated at a plurality of depths in the borehole, such that said step of determining a formation factor is performed at each position of the transmitter.

13. The method of claim 12, wherein the transmitter and the auxiliary receiver are affixed, such that said steps of positioning a transmitter and positioning an auxiliary receiver are performed simultaneously and such that the transmitter and the auxiliary receiver are moved together between said positioning steps.

14. The method of claim 13, wherein said step of positioning the distant receiver is repeated at a plurality of positions relative to a position of the transmitter, such that said step of determining a formation factor is preferred at each position of the distant receiver.

15. The method of claim 1, wherein said steps of positioning the transmitter and positioning the auxiliary receiver includes positioning the transmitter and positioning the auxiliary receiver within 0.5 meters apart.

* * * * *